(12) United States Patent
O'Herlihy et al.

(10) Patent No.: US 10,654,411 B2
(45) Date of Patent: May 19, 2020

(54) DETECTING SERVICE PROVIDER STATE BASED ON RECEIVED AND HISTORIC TELEMATICS DATA AND SERVICE PROVIDER CHARACTERISTICS

(71) Applicant: Uber Technologies, Inc., San Francisco, CA (US)

(72) Inventors: Michael O'Herlihy, San Francisco, CA (US); Karna Chokshi, San Francisco, CA (US); Matthew Joseph Doyle, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 282 days.

(21) Appl. No.: 15/660,947

(22) Filed: Jul. 26, 2017

(65) Prior Publication Data

US 2019/0031097 A1    Jan. 31, 2019

(51) Int. Cl.
*B60Q 9/00* (2006.01)
*H04L 29/08* (2006.01)
*B60W 40/09* (2012.01)

(52) U.S. Cl.
CPC ............... *B60Q 9/00* (2013.01); *B60W 40/09* (2013.01); *H04L 67/12* (2013.01); *H04L 67/306* (2013.01)

(58) Field of Classification Search
None
See application file for complete search history.

(56) References Cited

U.S. PATENT DOCUMENTS

| | | |
|---|---|---|
| 9,141,582 B1 | 9/2015 | Brinkmann et al. |
| 9,189,897 B1 | 11/2015 | Stenneth |
| 2002/0091473 A1 | 7/2002 | Gardner et al. |
| 2004/0209594 A1 | 10/2004 | Naboulsi |
| 2016/0001781 A1 | 1/2016 | Fung et al. |
| 2016/0282124 A1* | 9/2016 | Chowdhury ......... G07C 5/0816 |
| 2017/0144671 A1* | 5/2017 | Memani ................ B60W 40/09 |
| 2017/0166217 A1* | 6/2017 | Sbianchi .................. A61B 5/18 |
| 2017/0255966 A1* | 9/2017 | Khoury ................ G08G 1/0129 |
| 2018/0297518 A1* | 10/2018 | Armitage ................. B60Q 9/00 |

OTHER PUBLICATIONS

PCT International Search Report and Written Opinion, PCT Application No. PCT/IB2018/055042, dated Oct. 8, 2018, 16 pages.

* cited by examiner

*Primary Examiner* — Curtis A Kuntz
*Assistant Examiner* — Shawna M Kingston
(74) *Attorney, Agent, or Firm* — Fenwick & West LLP

(57) ABSTRACT

A network system is configured to facilitate a safe service coordination environment. The network system detects abnormal user states (e.g., sleepiness, inebriation, etc.) and provides corrective recommendations to those users. To do so, client devices executing an application send information associated with the service to the network system. The network system determines an aggregate set of service characteristics based on the aggregate telematics data. The network system also determines a provider profile for a provider providing service in the environment describing the deviation of the user's driving characteristics from the aggregate service characteristics. Based on the difference between the aggregate characteristics and the user profile, the network system determines the provider state using a state verification process. Based on the determined provider state, the network system determines a set of corrective recommendations and sends the corrective recommendations to the provider device.

20 Claims, 6 Drawing Sheets

DETECTING SERVICE PROVIDER STATE BASED ON RECEIVED AND HISTORIC TELEMATICS DATA AND SERVICE PROVIDER CHARACTERISTICS

FIELD

This description relates generally to determining the abnormal state of a user executing an application on a device and more particularly for determining the state based on received and historic telematics data and received and historic user characteristics.

DESCRIPTION OF RELATED ART

Client devices and their installed applications provide various functions to a user in a system environment. For example, an application can provide a function to connect users to coordinate services by providing the ability to access information on the internet, send messages between users, etc. In some instances, users of the service coordination application that provide the service to others choose to provide the service when in an abnormal state. Generally, providing the service when in an abnormal state (e.g., intoxicated, sleep deprived, etc.) leads to a more dangerous service coordination environment.

Detecting abnormal states of users providing the service has typically relied on receiving reports from other users within the service coordination environment. However, these reports can be unreliable for many reasons and can be detrimental to the service coordination environment.

SUMMARY

A provider state detection system (also referred to herein as "a network system" for simplicity) detects an abnormal provider state of a provider providing service to a service requester within an environment by analyzing the information associated with the service. Detecting an abnormal provider state is challenging when providers, routes, and environments are highly variable. For example, the information associated with a service provider that changes velocity frequently during traffic may be similar to information associated with a service provider that changes velocity frequently because they are intoxicated. Accordingly, the network system determines an abnormal provider state by analyzing the current service information and provider profile of a specific provider relative to the aggregate information associated with the service and provider profiles of a group of providers. In some embodiments, the determination of the provider state is further based on the route and environment of the service.

In one embodiment, the network system determines abnormal driving characteristics of a provider providing service within the environment to facilitate determining an abnormal provider state. To determine the abnormal driving characteristics, the network system receives telematics data and a provider profile from the provider device associated with the route of the service. Additionally, the network system accesses aggregate telematics data and an aggregate provider profile for the route from a datastore. The network system determines an expected frequency of abnormal behavior for the provider along the route based on the received telematics data and provider profile. The determined expected frequency is described relative to the frequency of abnormal behavior determined from the accessed aggregate telematics data and aggregate provider profile along the route. The network system determines the current frequency of abnormal behavior for the provider along the route and compares it to the expected frequency of abnormal behavior along the route. If the difference is above a threshold, the network system determines that the provider is providing service with abnormal driving characteristics.

The network system determines based on the abnormal driving characteristics, provider profile, and service information that the provider may be in an abnormal state. The network system sends a state verification request to the provider device to determine the state of the provider. The state verification request provides an interactive test to the provider and the provider client device measures the responses to the test and sends the responses to the network system. The network system determines if the provider is in an abnormal state based on the responses to the interactive test and a state investigation ruleset or provider state detection model. In another embodiment, the network system sends a state verification request to the provider after receiving a state verification query from a requester device receiving the service.

The network system determines a set of corrective recommendations for the provider based on the identification of an abnormal provider state, the service information, the user profiles, or any other information in the environment. In some examples, the corrective recommendations provide a route to a nearby coffee shop or disallow the provider from providing service for an amount of time. After providing the corrective recommendations to the provider device, the network system can monitor whether or not the corrective recommendations have been followed. If the corrective recommendations are not followed by the provider, the network system can provide a subsequent set of corrective recommendations.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Within a system environment for a service coordination system, in which providers provide service to service requesters, facilitating safe service between service requesters and providers is desirable. In these environments, abnormal provider behavior can lead to unsafe service. Abnormal provider behavior (e.g., unsafe driving characteristics, negative interpersonal interactions) can be caused by a provider being in any number of abnormal states (e.g., angry, intoxicated, sleepy, etc.) that negatively affect the performance of the provider in the environment.

Figure 1:
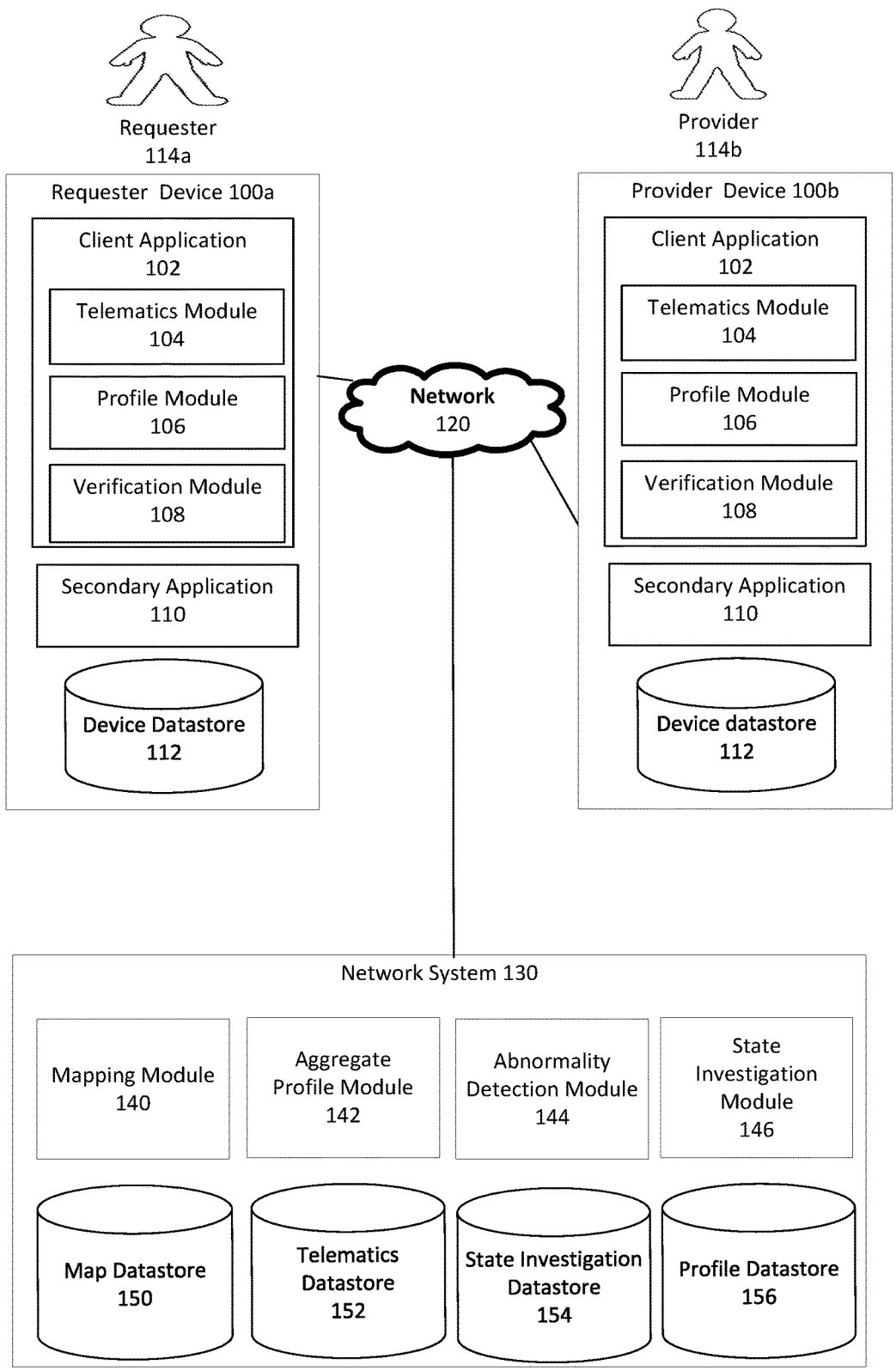
FIG. 1 is a block diagram of a system environment for a service coordination system that that can detect an abnormal provider state, in accordance with some embodiments.

FIG. 1 is a block diagram of a system environment for a service coordination system such as network system 130 that can detect an abnormal provider state and provide recommendations to the provider based on the detected abnormal provider state, in accordance with some embodiments. FIG. 1 includes client devices 100, a network 120, and a network system 130. In the illustrated embodiment, the client devices 100 can be a provider device 100b or a requester device 100a, and for clarity, only one provider device 100b and one requester device 100a are shown in FIG. 1. Alternate embodiments of the system environment can have any number of client devices 100 and network systems 130. The functions performed by the various entities of FIG. 1 may vary in different embodiments. Broadly, the network system 130 coordinates service between a requesting user 114a operating a requester device 100a and a provider 114b operating a provider device 100b.

Within the context of the environment, when a provider 114b provides a service (e.g., a transport, delivery service, etc.) the network system 130 receives and analyzes service information and telematics data associated with the provider client device 100b to determine whether the provider 114b is behaving abnormally due to being in an abnormal state. Based on this analysis, the network system 130 can request a verification of the provider state by sending a verification request to the provider device 100b. The provider 114b interacts with the provider device 100b to determine the provider state. Using the determined provider state, the network system 130 can provide a set of corrective recommendations to the provider. The corrective recommendations can facilitate recovering an abnormal provider state. Generally, verifying the provider state allows the network system to prevent providers in an abnormal state from providing service.

The client devices 100 and network system 130 comprises a number of modules, which refers to hardware components and/or computational logic for providing the specified functionality. That is, a module can be implemented in hardware, firmware, and/or software (e.g., a hardware server comprising computational logic, or computer storage medium comprising computational logic), other embodiments can include additional modules, can distribute functionality between modules, can attribute functionality to more or fewer modules, can be implemented as a standalone program or as part of a network of programs, and can be loaded into memory executable by processors.

A requesting user 114a can request service from the network system 130 via a requester device 100a and a provider 114b receives requests to provide service from the network system 130 via a provider device 100b and provides the service. In one embodiment, client devices 100 can include a client application 102, a secondary application 110, and a data store 112. Client devices 100 can be personal or mobile computing devices, such as smartphones, tablets, or notebook computers. In some embodiments, the provider 114 is a person operating a vehicle capable of transporting passengers. In other embodiments, the provider 114b is an autonomous vehicle that receives routing instructions from the system 130. For convenience, this disclosure generally uses a car with a service provider as an example provider 114b. However, the embodiments described herein may be adapted for a provider 114b operating alternative vehicles.

Within the environment a provider device 100b can include the functionality of a requester device 100a and vice versa. That is the provider device 100b and the requester device 100a can be considered interchangeable. For ease of description, service requesters 114a and providers 114b may be referred to in aggregate as users 114, while requester device 100a and provider device 100bs 100 are referred to in aggregate as client devices 100.

The client devices 100 include software applications, such as application 102 and secondary application 114, which execute on the processor of the respective client device 100. The application 102 executing on the client device 100 performs a function (or functions) in the environment (e.g., service coordination, delivery service, etc.). The application includes a telematics module 104, a verification module 108, and a profile module 106. The secondary application 114 can perform a function associated with determining the provider state (e.g., determine provider state, measure provider state, report provider state, etc.). Additionally, the client applications and secondary applications can communicate with one another and with network system 130 via the network 120. Examples of applications 102 (and 110) can be a transportation coordination application, a web browser, a social networking application, a messaging application, a gaming application, a media consumption application, etc. Each application 102 can be linked to a user account on the network system 130 associated with a client device 100, the client device user 114 or group of client device users. In some embodiments, the client devices 100 execute a client application 102 that uses an application programming interface (API) to communicate with the system 130 through the network 120.

Through operation of the application 102 executing on the client devices 100, users can interact to make service requests and provide service via the system 130. Through the interactions, the users can send and receive information associated with the service. This information will be generally referred to as service information. Service information can include: service requests, provider invitations, assignment requests, server notifications, state verification requests, state verification queries, state correction recommendations, or any other information that can facilitate coordinating service between users and verifying provider states. Moreover, service information includes telematics data associated with the client devices using the system 130. Telematics data will be described in more detail below. Further, an application 102 can present service information on a user interface of a client device 100, or translate the service information into audio signals to be played by the client device. The client device can display service information such as a map of the geographic region, the current location of the client devices, route instructions, corrective recommendations, and provider state requests, etc. The client device can play audio navigation aids to assist in efficient service.

As described above, the service information can include a service request. A service request indicates that a requesting user 114a is requesting to coordinate service with a provider 114b. Through operation of the requester device 100a, a requesting user 114a can make a service request to the network system 130 via the network 120. The service request includes information that facilitates a requesting user 114a coordinating service with a provider 114b. For example, a service request may include user identification information, the number of passengers for the service, a requested type of the provider (e.g., a vehicle type or service option identifier), the current location and/or the start location (e.g., a user-specific location, or a current location of the user device 100), the destination for the service, or any other similar information.

Similarly, the service information can include an assignment request. An assignment request notifies a provider 114b that a requesting user 114a is requesting a provider for a service. For example, the network system 130 can receive a service request and locate providers in the area that are available to provide service. Subsequently, the network system 130 sends an assignment request to provider 100b devices that are available to provide service to the requesting user 114a. The provide request includes information that facilitates coordinating service between a requesting user 114a and a provider 114b. For example, the provide requests can include expected service duration, expected service reimbursement, service system loads, number of passengers, etc.

Additionally, the service information can include a provide request. A provide request indicates that a provider 114b receiving an assignment request is able to provide service to a requesting user 114a. Through operation of the provider device 100b, a provider 114b can make a provide request to the network system 130 via the network 120. The provide request can include information that facilitates a provider 114b providing service to a user 114a. In some embodiments, a provider request associates a requesting user 114a and a provider 114b for service via the network 120. The provide request can include the location of the provider, the make and model of the provider vehicle, the estimated time of arrival to the requesting user, etc.

Within this description a series of examples are provided to illustrate the network system 130 operation. In these examples, Dan is operating a vehicle within the environment to provide service using the service coordination application 102 on a provider device 100b and Chris is requesting and receiving service using the service coordination application 102 on a requesting user device 100a.

To give context to the service coordination environment a brief description of coordinating service between Dan and Chris is given. After work, Chris decides to use the service coordination application 102 on his service device 100a to make a service request to a local eatery using the network system 130. The service request includes the current location of Chris' requesting user device 100a and the location of the local eatery. The network system 130 receives the service request and associated service information and determines that the providers Dan and Greg may be able to provide the service to Chris. The network system 130 sends an assignment request to Dan and Greg that includes service information including the projected fare and projected service time. Greg is unable to provide a service at the moment and declines the assignment request via his provider device 100b. Dan is less busy and is able to provide service to Chris. Dan accepts the assignment request and, in turn, sends a provide request to network system 130 including his telematics data. The network system 130 provides additional service information to Dan's provider device and Chris' user device to further coordinate the service. Dan proceeds towards Chris' location to provide him service to the local eatery.

In some embodiments, a provider can indicate availability for receiving assignment requests via a client application on the provider device 100b. This availability may also be referred to herein as being "online" (available to receive assignment requests) or "offline" (unavailable to receive provide requests). For example, a provider can decide to start receiving assignment requests by going online (e.g., by launching a client application or providing input on the client application to indicate that the provider wants to receive assignment requests), and stop receiving assignment requests by going offline. In some embodiments, when a provider device 100b receives an assignment request, the provider has the option of accepting or rejecting the assignment request. By accepting the assignment request, the provider is assigned to the user, and is provided service information (e.g., start location, destination location, etc.). In another example, the service information is provided to the provider device 100b as part of the provide request (rather than after accepting the assignment request).

In some embodiments, the system 130 provides a route as part of the service information exchanged during service coordination. A route is the directional information provided by the network system 130 to guide requesting users 114a and providers 114b to geographic locations within the environment. Routes can be associated with various route information such as road type, traffic conditions, construction conditions, traffic levels, road hazards, traffic signs, geographic area, etc. Further, routes can be segmented into any number of subsections and each subsection can be independently associated with subsection information similar to above. Additionally, the system 130 can transmit routes to a client device 100 during service coordination. For example, the network system 130 can transmit a route from the network system to a provider device 100b as part of an assignment or provide request. The transmitted route directs a provider 114b from their current location to the location of the requesting user or can direct a provider to the requesting user's destination. The provider device 100b can present the route to the provider in step-by-step instructions or can present the entire route at once. Further, the provider device 100b can continuously receive updates to the route as the provider operates within the environment.

Returning to the client devices of FIG. 1, the telematics module 104 determines telematics information associated with a client device 100. Telematics information can include any information regarding the position, velocity, orientation, acceleration, altitude, proximity, or any other service, geographic, or location based information. Generally, the telematics module 104 may gather information from sensors on the device (e.g., global positioning systems, gyroscopes, accelerometers, etc.) to identify telematics data of the client device 100.

In one embodiment, the telematics module 104 includes a global positioning system (GPS), but the description herein can be applied to any other type of geographic coordinate system or sensor detection systems. For example, the telematics module uses sensors (e.g., a GPS receiver) included in the client device 100 to determine the position of the client device 100 at various instances in time. In one embodiment, the current position of the client device 100 is represented by a location identifier such as latitude and longitude coordinates. The current position of the client device 100 is also associated with a time stamp indicating the time and the date in which the telematics module measured the current position of the client device. The telematics module 104 can use subsequent location identifiers and the associated time stamps to determine velocity, acceleration, expected position, or any other inferable telematics data. Alternatively, telematics data of the client device 100 may be manually inputted into the telematics module 104 by the user of the device 100, such as by selecting a location on a map or in the form of an address including at least a street number and street name.

In some embodiments, the telematics module 104 receives telematics data from the sensor systems and associates the telematics data with the current position of the provider device 100b along the route. For example, a provider device 100b is travelling 65 mph down an interstate. The telematics module 104 measures the velocity and position of the provider device 100b and associates the measured telematics data with the route. In some examples the telematics module 104 transmits the associated telematics data to the network system 130. Further, the telematics data can be stored in the telematics datastore 152 of the network system.

The client device 100 also includes a profile module 106. The profile module creates, manages, and updates a user profile of a user using a client device. In the example of a client being a provider providing service, the profile module can build a provider profile as a provider operates within the environment. In this example, the provider profile describes the driving characteristics of a provider. The driving characteristics can describe velocity, acceleration, lane changes, adherence to routes, etc. Additionally, the driving characteristics can be associated with information about the route. For example, the driving characteristics can describe a velocity on a road segment of a route relative to the speed limit of that road segment.

Further, the driving characteristics can also describe a provider's abnormal driving characteristics such as sudden velocity changes (e.g., hard stops), sudden acceleration changes, position variance (e.g., weaving), etc. In some embodiments, the driving characteristics can be described relative to the average driving characteristics of all providers within the environment. For example, the provider profile can describe the average frequency of abnormal driving behavior and the standard deviation from the average frequency of abnormal driving behavior of a group of providers within the environment, such as on a particular road segment. Additionally, the driving characteristics of provider profiles can be associated with a route or a subsection of a route. For example, the profile module 106 determines the frequency of hard stops of a provider along an interstate. As such, the profile module describes the frequency of hard stops of the provider along the interstate relative to other providers that have travelled a similar interstate. In some cases, the average driving characteristics of providers can be considered abnormal. In these instances, the abnormal driving characteristics, while still abnormal, may not indicate variance from the aggregate.

In examples where providers are coordinating service for the first time, the profile builder module can create a new provider profile. To initialize a provider profile, the profile module 106 creates a provider profile based on the aggregate telematics data gathered from all of the providers operating in the environment. A newly initialized provider profile is a base provider profile. The base provider profile can be thought of as the average driving characteristics of all providers within the environment. In some embodiments, the profile module receives the base provider profile from the network system 130. Alternatively the profile module 106 receives the set of aggregate telematics data from the network system and generates the base provider profile. In still other embodiments, the provider device 100b accesses the aggregate telematics data stored in the telematics datastore 152 of the network system 130 to generate a base provider profile.

Continuing in the context of the aforementioned example, today is the first time that Dan is providing service using the service coordination application. As such, the profile module 106 of Dan's client device receives a base provider profile from the network system 130 and associates the base provider profile with Dan's system account. Some example driving characteristics described in the base provider profile include: the average speed of providers driving on a residential road segments in the environment is 20 mph, the typical frequency of lane changes for those road segments in a 15 min window is 2, and typical frequency of hard breaks on residential roads is 5 hard breaks per 5 miles travelled.

As a provider 114b provides service within the environment, the profile module 106 updates the base provider profile based on the telematics data gathered by the telematics module 104. That is, the driving characteristics of each provider profiler are updated using new telematics data such that the base provider profile becomes more representative of the provider. These provider profiles are measured provider profiles. The measured provider profile can be thought of as the average driving characteristics of one specific provider within the environment. In one embodiment, the profile module 106 updates a base provider profile by receiving telematics information from the telematics module of the provider device 100b, calculating new driving characteristics, and updating the base provider profile. The profile module 106 calculates new driving characteristics by using the measured telematics data to update averages and standard deviations of the appropriate characteristics. In another embodiment, the profile module 106 receives updated measured provider profiles from the network system. The profile module 106 can store the provider profiles in device datastore 112 of the provider device 100b or the profile datastore of the network system 130.

In various embodiments, measured provider profiles are continuously updated as a provider provides service within the environment. Accordingly, the driving characteristics of each measured provider profile are continuously updated based on the measured telematics data of a provider coordinating service within the environment.

In one embodiment, the driving characteristics of a provider profile are described relative to the aggregate provider profiles (e.g., a provider drives 5% faster than average, or a service provider hard breaks half as often on average, etc.). For example, Dan generally drives slower and more carefully than the average provider in the environment. The telematics module of Dan's provider device 100b measures that Dan travels at 15 mph on residential road segments in the environment, changes lanes 0.2 times in a 15 min window, and hard breaks 1 time per 5 miles. In one embodiment, the profile module of Dan's device continuously updates Dan's provider profile to reflect these measured driving characteristics. In another embodiment, Dan's provider device 100b sends the telematics data to the network system and receives an updated provider profile for Dan in return.

A provider profile can further include information associated with the provider state to facilitate a safe service coordination environment. For example, the provider profile can include information regarding the state of the provider such as: current, previous, or predicted provider states, previous, current, or predicted state verification requests and results, and any other information associated with a provider state. Because the provider profiles include additional information regarding provider states, the profile module 106 can interact with the verification module 108 or the network system 130 to update any corresponding information as it changes within the environment.

For example, Dan may have previously received complaints from users due to his slow, safe, and methodical driving. Further assume that, in response to these prior complaints, the network system has previously determined that Dan was not in an abnormal provider state despite his slower than average driving characteristics observed on multiple occasions. Thus, Dan's provider profile can indicate that slow driving is not associated with an abnormal provider state for Dan.

A client profile in various embodiments is also associated with each requesting user 114a requesting and receiving service using via a requester device 100a. In one example, the requesting user profile describes the usage characteristics of a requesting user. The usage characteristics can describe previous, current, and expected verification queries (e.g., reports of abnormal states), previous results to verification requests generated from verification queries, frequency of previous verification queries and verification requests etc.

Similar to a provider profile, the profile module 106 creates a new requesting user profile based on the aggregate usage data gathered from all of the requesting users operating in the environment. A newly initialized requesting user profile is a base requesting user profile. As the requesting user receives service within the environment, the profile module 106 updates the base requesting user profile based on the usage characteristics gathered by the requesting user requester device 100a and network system 130. An updated requesting user profile is a measured requesting user profile. The usage characteristics of each measured requesting user profile are continuously updated based on the usage characteristics of a requesting user participating in service coordination within the environment.

For example, the first time that Chris receives service using the service coordination application 102 the profile module 106 of Chris' client device receives a base user profile from the network system 130 and associates the base user profile with Chris' system account. Some example usage characteristics included in the base requesting user profile include: the average number of verification queries by a requesting user and a frequency of slow driving complaints of service requesters within the environment. Verification requests and queries are described in more detail below. Chris does not send state verification queries about providers frequently. Chris has only sent a state verification query state 3 times in 500 services. The profile module 106 of Chris' ride device continuously updates Chris' user profile to reflect these characteristics. However, each time Chris sent a state verification query to the network system, the provider state was measured to be abnormal. Accordingly, Chris' user profile includes information indicating that a state verification query received from Chris' requester device 100a is likely to indicate an abnormal provider state.

In various embodiments, client profiles (both requesting user and provider) and their respective characteristics can be tailored for any service within the service coordination system. That is, a client profile can give the characteristics of a specific client coordinating service based on any set of circumstances within the environment including: the route of the service, the number of service requesters, the time of day, the region of the environment, the type of road segment (s), the level of traffic in the environment, the weather, the make and model of the provider vehicle, requesting user characteristics, provider characteristics, and information stored in the device datastore, etc.

Whatever the embodiment, client profiles are continuously updated by the profile module 106 and the network system 130 to reflect the characteristics of a client coordinating service in the environment to facilitate a safe service coordination environment.

Returning to the client device of FIG. 1, the verification module 108 is used to verify a provider state. The verification module 108 sends state verification queries and receives and executes state verification requests from the network system 130. A state verification query is a request from a requesting user 114a to the network system 130 to verify the state of a provider 114b. A verification request is a request from the network system 130 to a provider 114b to verify the provider state. The state verification queries can include service information, an expected provider state, an image or recording, etc. The state verification requests can include service information, a state verification process, an image or recording, etc.

A state verification request is received by the verification module 108 after the network system determines that the provider state may be abnormal. The network system may determine that the provider state is abnormal after the abnormality detection module 144 detects abnormal driving characteristics, the state investigation module 146 receives and appropriate state verification request, or the state investigation module determines that the service provider state is abnormal. These are discussed in more detail below. The verification request is executed by the provider device 100b to verify the state of the provider. Typically, the provider device 100b executes the received state verification process. In one embodiment, the state verification process measures the characteristics of the provider's state using the verification module 108. The verification module 108 determines the provider state based on the measured characteristics and transmits the provider state to the network system 130. In another embodiment, the verification module 108 sends the received responses to the network system 130 and the network system determines the provider state. In some embodiments, the provider device 100b can execute secondary applications 110 of the client device to execute a state verification process (e.g., a biometric data collection application, a responsiveness game application, a photo recording application, etc.).

Expanding on this concept, in one embodiment, the verification module 108 determines the provider state by providing an interactive test to the provider with a set of interaction requests to which a provider must respond. Based on the received interactions, the verification module determines the provider state and transmits the provider state to the network system (or transmits the responses to the network system). Determining the provider state using the verification module 108 (or network system 130) can be based on a variety of information recorded during the interactive test including the response time of a provider (e.g., how long it takes to respond to interaction requests), response accuracy of a provider (e.g., correctness of the interactions), input/output data of the provider device 100b (e.g., how a provider interacts with a provider device 100b), images, audio, or videos of the provider or the provider device's 100b surroundings (e.g., a self-photo, a voice recording, etc.), biometric data received from the provider device 100b (e.g., measured horizontal gaze nystagmus), system information of the client device and application (e.g., number of hours a provider is online), a user (or number of users) receiving the service, a service provider providing the service, a service provider becoming idle during service (e.g., online but not providing service), etc. A more detailed description of how the network system 130 determines an abnormal provider state is provided below with respect to the state investigation module 146.

In a similar embodiment, the interactive test to determine a provider state may be inconclusive (e.g., the interactions may fall within an error margin, a partial pass or failure of the interactive test, the interactive test determines several possible abnormal service provider states etc.). In this case, the verification module 108 (or the state investigation module 146) may provide an additional state verification request to the provider device 100b to determine the provider state. The additional state verification request can include an additional interactive test or tests.

Further, the recorded interactions of each provider can be compared to information included in the provider profile. That is, the verification module can compare the responses of a currently executing state verification process to historical information in the provider profile to more accurately determine an abnormal state of a provider (e.g., responses for the current test are slower than the previous test, etc.). The verification module 108 can interact with the profile module 106 to update a provider profile based on the state verification process.

For example, Dan has been online and providing service for eight hours without rest. The verification module 108 on Dan's provider device 100b receives a verification request from the network system 130 including an alertness test after the state investigation module determines that his abnormal driving characteristics are indicative of an abnormal state (i.e., tiredness, mental fatigue, or general degradation in driving performance due to time driving). At this point in the evening Dan is tired, and his level of alertness has degraded. Dan's provider device 100b executes the alertness test and provides several queries to Dan via the user interface of his provider device 100b. Dan responds to the queries via the user interface of his provider device 100b to the best of his ability. Because Dan's alertness has degraded, his response times to the queries are greater than a maximum threshold level and the verification module 108 determines that Dan's provider state is abnormal. The threshold level describes the maximum response times that do not indicate an abnormal provider state and can be determined either by the implementer, or by the state investigation module 146 using machine-learning techniques. Dan's client device 100b provides the results of the verification request to the network system 130. Finally, Dan's client device 100b provides the results of the state verification request to the profile module 106 and the profile module updates Dan's provider profile. In some cases Dan's client device can receive corrective recommendations to for Dan to cease providing service and take a break. Dan's provider profile now indicates that he has previously provided service in an abnormal state. At a future time, the state investigation module 146 can access Dan's previous record of providing service in an abnormal state to determine if Dan is again providing service in an abnormal state.

Additionally, the verification module 108 sends a state verification query to the network system 130. For example, during service a requesting user 114a perceives that the provider 114b providing the service is in an abnormal provider state (i.e. driving slowly, weaving, impaired communication, etc.). Accordingly, the requesting user 114a interacts with the verification module 108 of the requesting user device 100a to send a state verification query to the network system 130. The state verification query can include information regarding driving characteristics, provider state, route information, vehicle state, etc.

For example, Dan provides a transportation service to Chris using the service coordination application. During the service Chris notices that Dan is routinely yawning, rubbing his eyes, and driving abnormally. Concerned, Chris uses the verification module 108 of his requesting user device 100a to send a verification query to the network system 130 including information that Dan's provider state is abnormal.

The verification module 108 also acts to ensure a safe service coordination environment. As such, the verification module receives 108 a set of corrective recommendations from the network system 130 that facilitates recovering an abnormal state of the provider 114b. Generally, the corrective recommendations are based on the determined state of the provider (e.g. tired, inebriated, confrontational, etc.), but can be based on any other information in the environment (e.g. received telematics data, determined abnormal driving characteristics, state verification queries, etc.). The set of recommendations can include a recommendation for the provider to go offline.

For example, the verification module 108 and the network system 130 has determined that Dan is tired (e.g., in an abnormal provider state) and is providing a sub-par service to service requesters. The verification module 108 of Dan's provider device 100b receives a set of corrective recommendations from the network system 130. For example, the corrective recommendations may include that Dan take a break from providing service to requesting users or provides a route to the nearest coffee shop.

In one embodiment, the verification module 108 acts to verify that the corrective recommendations are followed by the provider 114b. For example, the verification module 108 sends service information relating to the corrective recommendations to the network system 130 and the network system determines if the corrective recommendations have been followed. Further, the network system 130 can provide an updated set of corrective recommendations to the provider device 100b based on the determination that the corrective recommendations were followed (or not followed). In another embodiment, the verification module 108 can verify that the corrective recommendations have been followed without interacting with the network system 130.

Continuing the previous example, Dan chooses not to take a break and continues to provide service in an abnormal state. Dan's provider device 100b continues to send service information to the network system 130 and the network system determines that Dan did not follow the corrective recommendations. In response, the network system 130 sends a new set of corrective recommendations to Dan's provider device 100b. Dan's verification module 108 receives the set of corrective recommendations which force Dan's client device into offline mode for 45 minutes so that he can take a break and is prevented from providing services arranged by network system 130.

Continuing with the client device of FIG. 1, the client devices 100 can include any number of secondary applications 110. The secondary application can interact with the verification module 108 to determine the state of a provider or to facilitate a safe service coordination environment as previously described. For example, the secondary application 110 can be a third-party application designed to perform a horizontal gaze nystagmus test.

Additionally, the client device includes a device datastore 112. The device datastore 112 contains information associated with the device user, the client device 100, a user account, a user profile, etc. This information can be accessed by the application 102 when coordinating service within the environment. Further, the information can be accessed, modified, or deleted when executing state correction recommendations. In one embodiment, the information can be used to build, store, modify, or update user profiles. The information stored in the device data store can include: inter-device security metrics, intra-device security metrics, network security metrics, authentication protocols, user account information and preferences, client device information and preferences, device user information and preferences, a record of preferences and changes, and location based information, applications executing on the client device, and any other information associated with recovering an application in the environment. In some embodiments, information stored in the device datastore 112 is included in the service information.

The client devices 100 communicate with the system 130 via the network 120, which may comprise any combination of local area and wide area networks employing wired or wireless communication links. In some embodiments, all or some of the communication on the network 120 may be encrypted.

As described above, the network system 130 assists in coordinating service between requesting users and providers while facilitating a safe service environment. The network system 130 includes a mapping module 140, an aggregate profile module 142, an abnormality detection module 144, and a state investigation module 146. The network system 130 receives service information, telematics data, and verification queries from client devices as they participate in the service coordination application. In response, the network system 130 provides service information, verification requests, and corrective recommendations to client devices 100 to facilitate the service coordination application. These interactions act to enable the network system 130 to determine abnormal driving characteristics of a provider, determine a provider state, and determine a set of corrective recommendations for the provider based on the verified provider state to promote a safe service coordination environment.

The network system 130 includes a mapping module. The mapping module 140 receives service information from client devices 100 in the environment and assists in service coordination. For example, the mapping module 140 can receive service information (e.g. telematics data) from client devices 100 and calculate a route for the service. To calculate a route, the mapping module accesses two geographic locations from the received service information. The mapping module 140 then accesses a map from the map datastore 150 that includes the two geographic locations. Maps will be discussed in more detail below. The mapping module 140 determines the most efficient route between the two geographic locations based on the map and associated information. The most efficient route can be based on absolute distance between two points, expected travel time between two locations, client profiles, weather conditions, traffic conditions, etc. The route is transmitted to the client devices 100 coordinating service via the network 120. As the client devices 100 participate in the service, the mapping module 140 continuously receives service information from the client devices 100 and continuously calculates and provides the most efficient route to the client devices 100.

Additionally, the mapping module 140 can receive service information from client devices 100 in the environment and facilitate provider state verification. In some embodiments, provider state verification is based on the network system 130 determining abnormal driving behavior during service. To enable the determination, the mapping module 140 can receive service information including telematics data from provider devices 100b during service and associate the received service information with a route (e.g. from home to work) or segment of the route (e.g. specific highways, roads, stoplights, etc.). The network system 130 then calculates abnormal driving behavior relative to the service information associated with the route. Further, the mapping module 140 can store the service information associated with the route in the telematics datastore 152. Over time, as more providers provide service along a route, each segment of the route will accrue a large amount of aggregated service information. Hence, the aggregated service information along a route in the telematics datastore 142 is used to form aggregate profiles that predict the behavior of providers along the route and calculate abnormal driving characteristics. Predictions and calculations of driving behavior will be discussed in more detail below.

For example, the network system 130 coordinates service for a large number of service requesters and providers from San Francisco International Airport to a nearby In-N-Out Burger. The mapping module 140 receives the service information for these services and accesses a map in the map datastore 150 including the two locations. The mapping module 140 calculates the most efficient route between SFO and In-N-Out. As the providers provide service to requesting users towards the eatery, the provider devices 100b transmit service information to the network system 130. For example, the stop light near In-N-Out (i.e. a route segment) routinely has traffic congestion and includes a large number of sudden traffic slowdowns. Accordingly, the service information received from providers using the route near the stop-light include a high number of sudden velocity decreases. The mapping module 140 associates high numbers of velocity decreases with the route (e.g. SFO to In-N-Out) and route segment (e.g. stop light near In-N-Out). The mapping module 140 stores the telematics data in the telematics datastore 152.

Returning FIG. 1, the network system includes an aggregate profile module 142. The aggregate profile module 142 determines aggregate user (both requesting user and provider) profiles based on the received service information of the client devices 100 (or group of client devices) operating in the environment. In one embodiment, the aggregate profile module 142 accesses the telematics datastore 152 and determines an aggregate user profile based on the stored aggregated telematics data. Alternatively, the aggregate profile module 142 can access the profile datastore 156 and generate and aggregate user profiles based on the stored user profiles (i.e. an aggregate user profile is an average of all user profiles). The aggregate profile module 142 can transmit aggregate user profiles to client devices 100 coordinating service in the environment to be used as base profiles. Additionally, the aggregate profile module 142 can transmit aggregate user profiles to the abnormality detection module 144 such that abnormal provider states can be determined. In one embodiment, the aggregate profile module 142 functions similarly to the profile module 106 and determines user profiles for single users operating in the environment.

User profiles (both aggregate and singular) can be representative of any cross section of information associated with the environment. Namely, the profiles can be very broad and based on one aspect of service information. As an example, the aggregate profile module 142 generates an aggregate provider profile for providers operating in Mountain View, Calif. Alternatively, the profiles can be highly specific and based on a large number of aspects of service information. For example, the profile module 106 generates a provider profile for a single male provider as he operates between the hours of 3:00 and 5:00 pm on weekends during fair weather conditions in Mountain View, Calif. These previous two examples are meant to provide context. However, profiles can also be determined based on any information contained in the associated service information.

Returning to of FIG. 1, the network system 130 includes an abnormality detection module 144. The abnormality detection module 144 detects abnormal driving characteristics of providers than can be indicative of an abnormal driving state and transmits any detected abnormal driving characteristics to the state investigation module 146. In one embodiment, the abnormality detection module 144 continuously monitors received telematics data of providers providing service to detect abnormal driving characteristics. In another embodiment the abnormality detection module is instructed to search for abnormal driving characteristics based on a received trigger such as an input from a requesting user associated with the provider using the service, a threshold amount of time the provider has been providing the service, a variation in the abnormality score, or a variation in the telematics data, etc.

To accomplish this, the abnormality detection module 144 receives service information associated with the route of a provider providing service from the provider device 100b. In another embodiment, the abnormality detection module 144 accesses the service information associated with a specific provider and route from the telematics datastore 152. For example, a provider is providing service along the route between SFO and In-N-Out. The provider device 100b sends the telematics data associated with the route to the network system 130.

After this, the abnormality detection module 144 determines a typical frequency of abnormal behavior associated with the route (or portion of the route) of the provider based on the stored aggregated telematics data. In this case, the abnormality detection module can access the aggregate service information stored in the telematics datastore. For example, the abnormality detection module 144 accesses the aggregate telematics data associated with the route of the service which describes frequency of hard stops along the route as 2 instances per 5 miles.

Continuing, the abnormality detection module 144 accesses the provider profile from the profile datastore 156 (or receives the provider profile from the provider device 100b). As previously described, the provider profile includes information that describes the deviation of the provider's driving characteristics from the typical frequency of abnormal behavior of a group of providers in the environment. In some examples, the accessed provider profile can be associated with the route. For example, the abnormality detection module 144 accesses the provider profile from profile datastore 156. The accessed provider profile describes that the provider along the route hard breaks one fewer time per five miles than the typical provider along the route. In other examples, the accessed provider profile describes that the provider generally hard breaks two fewer times per five miles than the typical provider within the environment.

Continuing the determination of abnormal driving characteristics, the abnormality detection module 144 determines an expected frequency of abnormal behavior for the provider along the route (or portion of the route) by adjusting the typical frequency of abnormal behavior based for the group of providers based on the accessed provider profile. For example, the abnormality detection module 144 calculates the expected frequency of hard breaks for the provider along the route from SFO to In-N-Out is one time per five miles (because the accessed provider profile indicates that the provider hard breaks one fewer time than average along the route).

After this, the abnormality detection 144 module calculates the current frequency of abnormal behavior of the provider device 100b based on the received telematics data and service information. The abnormality detection module 144 calculates an abnormality score reflecting the difference between the current frequency of abnormal behavior and the calculated expected frequency of abnormal behavior. For example, the abnormality detection module 144 calculates that the current frequency of hard stops for the provider along the route as 10 times per five miles. Thus, the abnormality detection module determines that the abnormality score is nine times per five miles or 900% higher than the expected frequency of abnormal behavior.

Based on the determined abnormality score, the abnormality detection module 144 identifies at least one abnormal driving characteristic of the provider. In one embodiment, if the abnormality score is above a threshold (e.g. a three sigma threshold), the abnormality detection module identifies the associated abnormal driving characteristic. The abnormality detection module 144 can send the at least one abnormal driving characteristic and its associated information (e.g., expected frequency, calculated frequency, provider profiles, etc.) to the state investigation module 146. For example, the abnormality detection module 144 has a maximum hard stop threshold level of 300% above the expected frequency of abnormal behavior. Thus, the abnormality detection module identifies that provider is currently executing hard stops abnormally.

The previous example gives context to detecting abnormal driving characteristics. In practice, calculating an expected frequency of abnormal behavior can include any sort of predictive analysis. For example, calculating the expected frequency can include techniques such as linear regression, logistic regression, time series models, regression splines, deviation analysis, and discrete choice models. Similarly, detecting abnormal driving characteristics can involve any number of anomaly detection techniques to determine an abnormality score. For example, detecting abnormal driving characteristics can include k-nearest neighbor algorithms, correlation based detection, cluster analysis, deviation from association rules, deviation from frequencies or average, threshold comparison, sigma analysis, etc.

Returning to the environment of FIG. 1, the network system 130 includes a state investigation module 146. The state investigation module 146 determines a provider state within the environment. Broadly, the state investigation module 146 determines a provider state by determining that a provider may be in an abnormal state and transmitting a state verification request to the corresponding provider device 100b. As previously described, the verification request can include a verification process that, when executed by a provider device 100b, functions to assist the network system 130 in determining the provider state. In some embodiments, the provider device 100b determines the provider state and transmits the determined provider state to the state investigation module 146. In other embodiments, the provider device 100b transmits information associated with the executed state verification process to the state investigation module 146 and the state investigation module determines the provider state.

As described above, the state investigation module 146 determines whether a provider may be in an abnormal state. Typically, the state investigation module 146 determines that a provider may be in an abnormal state by analyzing a set of factors including received service information, telematics data, verification queries, and user profiles, etc. The state investigation module 146 analyzes the set of factors by comparing the factors to a state investigation ruleset. The state investigation ruleset includes a set of rules which associate abnormal states to the aforementioned factors within the environment. That is, a particular abnormal state can be associated with specific service information, telematics data, user profiles, verification queries, etc. When determining the possibility of a provider being in an abnormal state, the state investigation module 146 can access the state investigation ruleset and determine if the received factors corresponds to an abnormal provider state. If the factors correspond to an abnormal provider state the state investigation 146 module sends a verification request to the provider device 100*b*. The state investigation ruleset can be stored in the state investigation datastore 154.

In some embodiments, the state investigation module can compare the factors to the state investigation ruleset and calculate a likelihood score describing a probability that a state is abnormal. Calculating the likelihood score can include the predictive models described above. If the calculated likelihood is above a threshold, the state investigation module sends a verification request to the provider device 100*b*.

In one embodiment, state investigation ruleset can be hierarchical. That is, some abnormal states are more significant than others and their associated rules are given a higher significance when the state investigation module determines to transmit a verification request to a provider device 100*b*. In some embodiments, the state investigation ruleset can be dynamically updated by the service information of the system or determined provider states.

In an alternative embodiment, the state investigation module trains a provider state detection model to detect an abnormal provider state using machine learning techniques. The provider state detection model can be initialized with a ruleset similar to the state investigation ruleset described above. That is, the model is initialized based on a set of conditions associating abnormal provider states to abnormal driving characteristics, routes, user profiles, service information, etc. As users coordinate s within the environment the state investigation module receives various information from the system and determines that a provider may be in an abnormal state based on the provider state detection model. Following this, the state investigation model can send a state verification request to the provider. Based on the determined state of the provider, the state investigation module can update the provider state detection model with any of the information received within the system to more accurately predict an abnormal provider state. Some example machine learning methods that may be used are: decision tree learning, clustering, Bayesian networks, reinforcement learning, etc.

Providing some context, the state investigation module receives a state verification query from a requester device 100*a* indicating that a provider of the service is inebriated. The state investigation module 146 accesses the state investigation ruleset and compares the received state verification query to the ruleset. Because of the severity of possible abnormal provider state, the ruleset indicates that the state investigation module 146 should transmit a verification request to the provider to verify the provider state. Thus, the state investigation module 146 sends a state verification request to the provider device 100*b* providing service to the requesting requester device 100*a*.

In a contrary example, the state investigation module 146 receives a state verification query from a requesting user device 100*a* indicating that a provider is driving slowly. The state investigation module 146 accesses the state investigation ruleset and compares the received state verification query to the ruleset. Because the possible abnormal provider states associated with slow driving are less severe, the ruleset indicates that the state investigation module should analyze the service information before transmitting a verification request to the provider. Therefore, the state investigation 146 module sends the associated service information to the abnormality detection module 144 for determination of abnormal driving characteristics.

In another example, the state investigation module 146 sends a request to analyze service information associated with a service between a requesting user and provider to the abnormality detection module 144. The abnormality detection module 144 responds to the request with at least one abnormal driving characteristic of the provider during the service. The state investigation module 146 accesses the state investigation ruleset and determines that the provider may be in an abnormal state and sends a state varication request to the provider device 100*b*. For example, the state investigation module 146 sends a request to the abnormality detection module to analyze the most recent service provided by Dan to Chris. The abnormality detection module 144 determines that Dan's driving speed is abnormally low and sends Dan's abnormal driving characteristics and associated information to the state investigation module 146. Based on Dan's provider profile and his abnormal driving characteristics, the state investigation module transmits a state verification request to Dan's provider device 100*b*.

In some embodiments, the abnormality detection module 144 automatically transmits abnormal driving characteristics of providers within the environment to the state investigation module 146. Expanding on this, the abnormality detection module monitors 144 all service between service requesters and providers and transmits abnormal driving characteristics to the state investigation module 146 as they occur. In turn, the state investigation module 146 determines which services may include providers in an abnormal state and transmits a state verification request to the appropriate providers.

When sending a verification request to a provider device 100*b*, the state investigation module 146 determines a verification process to include in the verification request. Typically, the verification process is associated with the determined possible abnormal provider state. The verification process can be included in the state investigation ruleset and associated with the rules, abnormal states, and factors contained within. Therefore state investigation module 146 can determine a verification process based on the suspected abnormal provider state, the service information, the client profiles, rules, or any other information within the ruleset. In one embodiment, the state verification processes are stored in the state investigation datastore 154.

In one embodiment, the state investigation module 146 receives information associated with the executing verification process and determines the provider state. The state investigation module 146 determines the provider state by analyzing the received information as previously described. In a similar embodiment, the state investigation module accesses the state investigation ruleset to determine the provider state based on the stored rules. In yet another embodiment, the client device determines the provider state and sends the determined provider state to the state investigation module.

Once the provider state has been determined, the state investigation module determines one or more corrective recommendations to transmit to the provider device 100b. As previously described, the corrective recommendations are a set of recommendations for the provider to recover a normal provider state. The state investigation module 146 determines the corrective recommendations by accessing the state investigation ruleset and determining which corrective recommendations to send to the provider device 100b based on the determined provider state, the client profiles, the service information, etc. That state investigation module 146 transmits the corrective recommendations to the provider client device. In one embodiment, the state investigation module determines that the provider is inebriated. Because the provider is in an abnormal state that can prove dangerous to others within the environment, the state investigation module generates more appropriate corrective recommendations. For example, the corrective recommendations can include ending a service, forcing the provider into offline mode, removing the ability of the provider to coordinate services via the network system, contacting law enforcement, etc. In some embodiments, the corrective recommendations are at the discretion of the implementer.

In some embodiments, the state investigation module monitors the provider client device to determine if the corrective recommendations have been or are being executed. Based on the execution the state investigation module can determine new corrective recommendations to transmit to the provider device 100b. In another embodiment, the state investigation module sends corrective recommendations to the provider device based solely on the determined abnormal driving characteristics.

The network system can include a map datastore, a telematics datastore, a state investigation datastore, and a profile datastore. The map datastore can store maps used to coordinate service in the environment. The maps (and the routes generated from the maps) can be associated with any type of geographic region (e.g. neighborhood, city, state, mountains, plains, country, etc.). The telematics datastore stores any of the telematics data generated in the environment. In some embodiments, the telematics data in the telematics datastore is associate with routes, maps, service providers, service requesters, geographic locations, etc. The state investigation datastore stores the state investigation ruleset, corrective recommendations, and any other information that can be used to determine the provider state. The profile datastore stores any profile generated by the network system or client devices (e.g., base, aggregate, measured, client profiles etc.).

Figure 2:
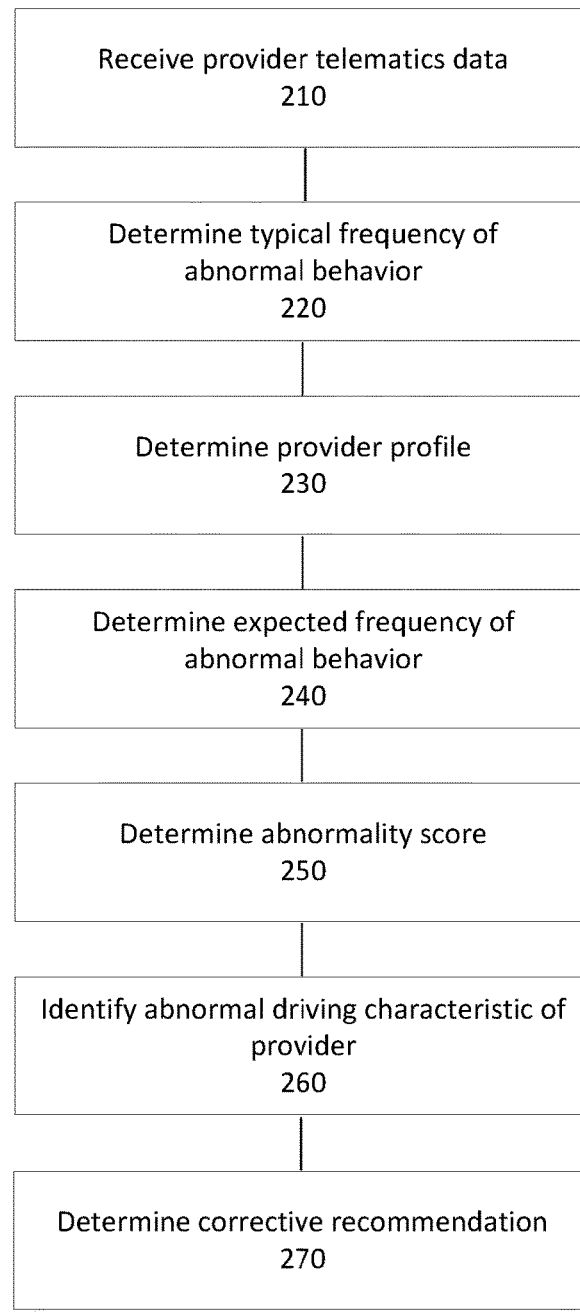
FIG. 2 is a flowchart illustrating a method for a network system to determine an abnormal state and provide correction recommendations, in accordance with some embodiments.

FIG. 2 is a data flow diagram illustrating a data flow that demonstrates determining an abnormal provider state and associated corrective recommendation, according to one example embodiment. The data flow may include more, fewer, or different steps, and the steps may be performed in an order different from what is illustrated in FIG. 2 and described herein. Generally, the data flow of FIG. 2 can occur on the network system 130, but can occur on any element or combination of elements within the environment.

To begin, a requester device and a provider client device are executing a service coordination application that allows the provider to provide service to the requesting user within a system environment. The provider client device transmits telematics data and other service information associated with the route of the service to the network system and the network system receives the telematics data 210 and other service information.

The abnormality detection module accesses the telematics datastore and determines a typical frequency of abnormal behavior 220. The typical frequency of abnormal behavior describes typical driving characteristics of a group of providers providing service in the environment based on the aggregate telematics data stored in the telematics datastore. Alternatively, the typical frequency of abnormal behavior can be based on an aggregate provider profile generated by the aggregate profile module. In some embodiments, the typical frequency of abnormal behavior is associated with the route of the service.

The abnormality detection module determines a provider profile 230. The provider profile describes the driving characteristics of the provider providing the service in the environment. In some cases, the provider profile describes the deviation of a provider's driving characteristics (e.g., frequency of abnormal behavior) from the driving characteristics of a group of providers within the environment. The provider profile can be based on the received telematics data and service information. In some cases, the determined provider profile 230 is associated with the route. In some cases, the provider client device determines the provider profile based on generated service information and telematics data and transmits the provider profile to the network system.

The abnormality detection module determines an expected frequency of abnormal behavior 240 for the provider based on the determined provider profile 230 and the determined typical frequency of abnormal behavior 220. In some cases, the determined expected frequency of abnormal behavior 240 is associated with the route. Following this, the abnormality detection module determines an abnormality score 250 reflecting a difference between the determined current frequency of abnormal behavior based on the received provider telematics data 210 and the determined expected frequency of abnormal behavior 240.

Based on the abnormality score, the abnormality detection module identifies at least one abnormal driving characteristic of the provider 260. The abnormality detection module transmits the abnormality score and the identified abnormal driving characteristic to the state investigation module. In one embodiment, the state investigation module determines the state of the provider based on a state investigation ruleset, service information, user profiles, etc.

The state investigation module determines corrective recommendations 270 including at least one corrective recommendation based on the state investigation ruleset. In some cases, the determined corrective recommendations are based on the determined provider state. The state investigation module transmits the state correction recommendations to the provider client device.

Figure 3:
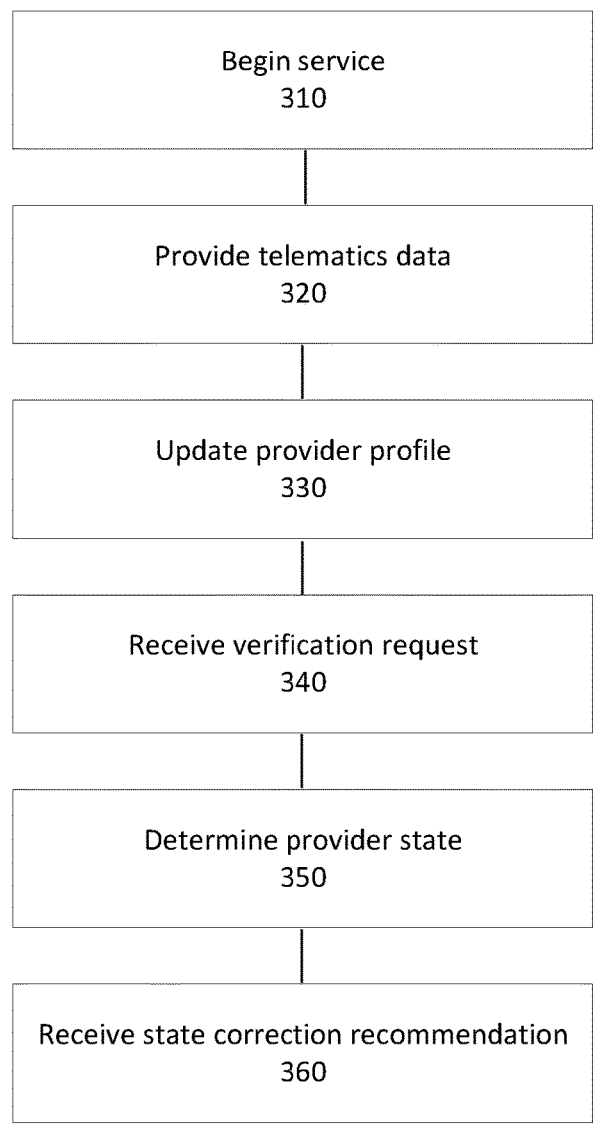
FIG. 3 is a flowchart illustrating a method for a network system to recover an application, in accordance with some embodiments.

FIG. 3 is a data flow diagram illustrating a data flow that demonstrates providing a service and receiving state correction recommendations, according to one example embodiment. The data flow may include more, fewer, or different steps, and the steps may be performed in an order different from what is illustrated in FIG. 3 and described herein. Generally, the data flow of FIG. 3 can occur on a provider device 100b, but can occur on any element or combination of elements within the environment.

To begin, a requester device and a provider client device are executing a service coordination application that allows the provider to begin providing service 310 to the requesting user within a system environment. The provider client device provides telematics data 320 and other service information associated with the route to the network system.

As the provider provides the service, the provider device 100*b* measures telematics data as the provider device 100*bs* travels along the route of the service. The profile module can update the provider profile 330 based on the measured telematics data. In some cases, the profile module transmits the provider profile to the network system.

The verification module of the client device receives a verification request 340 including a verification process and service information from the network system. The verification process, when executed determines the provider state 350. Typically, execution of the verification process provides the provider with a series of interaction requests to which the provider must respond. Based on the responses to the interaction requests, the verification module determines the provider state 350. In another embodiment, the verification module transmits the responses to the interaction requests to the network system and the state investigation module determines the provider state. After the determination of the provider state, the verification module receives a set of correction recommendations 360 from the network system. The correction recommendations, when executed facilitate recovering an abnormal provider state.

Figure 4:
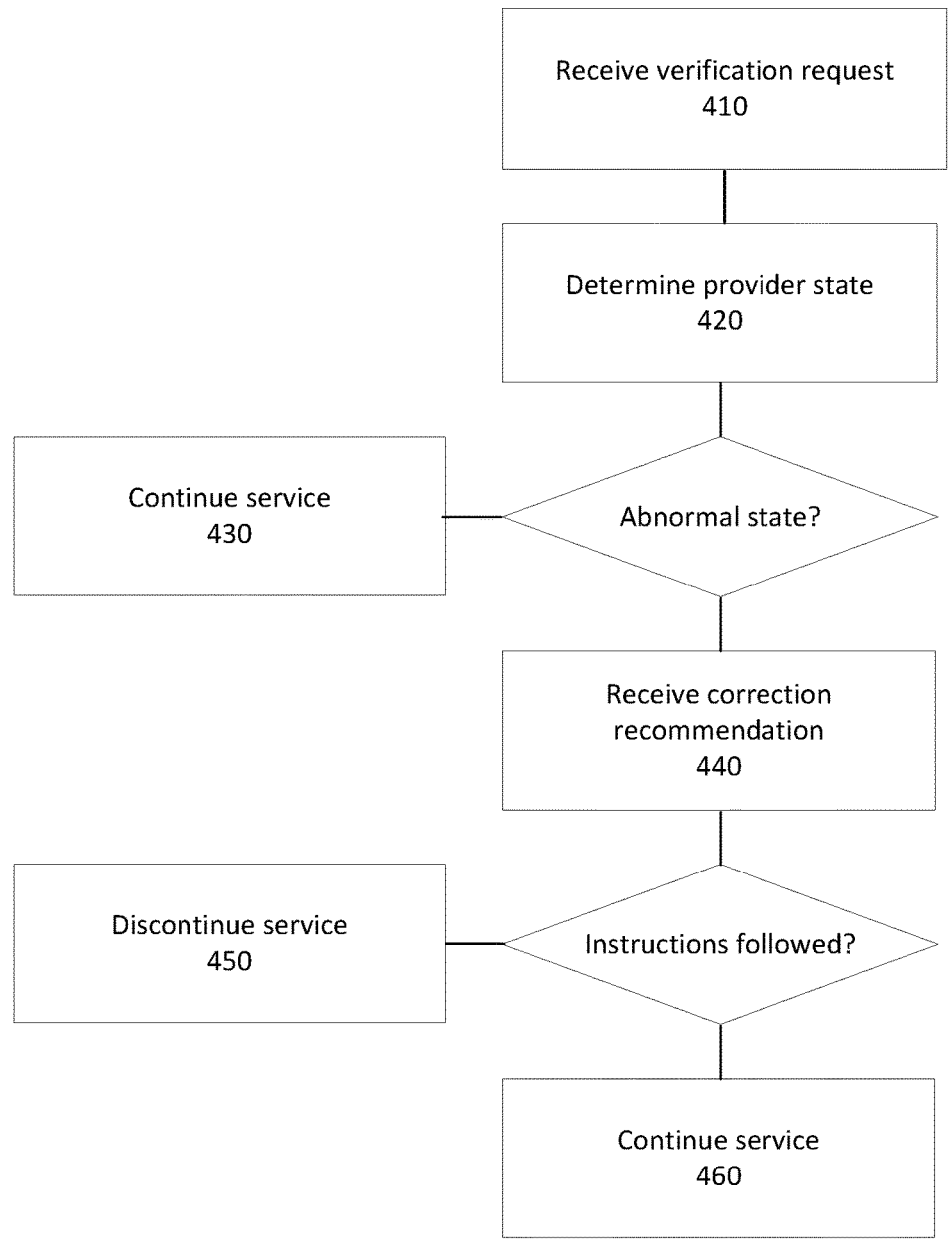
FIG. 4 is a flowchart illustrating a method for a client device to recover an abnormal provider state, in accordance with some embodiments.

FIG. 4 is a data flow diagram illustrating a data flow that demonstrates verifying a provider state and the resulting actions of the network system, according to one example embodiment. The data flow may include more, fewer, or different steps, and the steps may be performed in an order different from what is illustrated in FIG. 4 and described herein. Generally, the data flow of FIG. 4 can occur on a provider device 100*b*, but can occur on any element or combination of elements within the environment.

To begin, a requesting user device and a provider device are executing a service coordination application that allows the provider to provide service to the requesting user within the system environment. During service the network system determines that the provider may be in an abnormal state and transmits a verification request 410 to the provider client device. The provider client device receives the verification request from the network system.

The provider device 100*b* determines the provider state 420 based on the received verification request. This is described in more detail in regards to FIG. 5. If the determined provider state is not an abnormal state, the provider client device is allowed to continue the service 430. If the determined provider state is an abnormal state, the network system determines a set of correction recommendations based on the determined provider state and transmits the correction recommendations to the provider device 100*b*. The provider device 100*b* receives the correction recommendations 440 from the network system. If the provider does not follow one or more of the correction recommendations, the provider client device is forced into offline mode and discontinues service 450. If the provider client device does follow the correction recommendations, the provider client device can remain in online mode and continue service 460.

Figure 5:
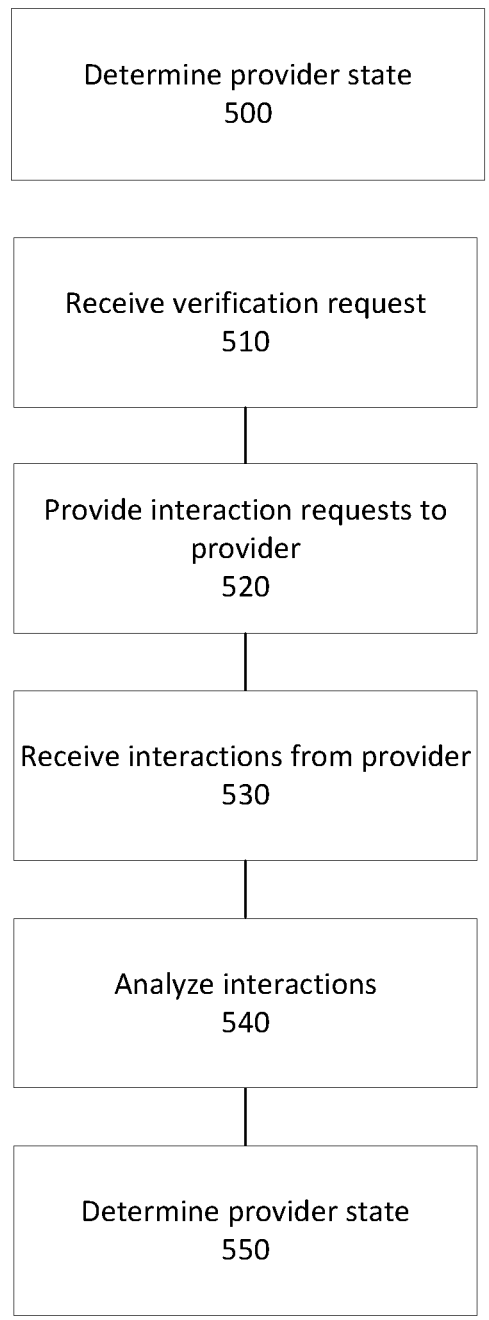
FIG. 5 is a flowchart illustrating a method for determining a provider state, in accordance with some embodiments.

FIG. 5 is a data flow diagram illustrating a data flow that demonstrates determining a provider state, according to one example embodiment. The data flow may include more, fewer, or different steps, and the steps may be performed in an order different from what is illustrated in FIG. 5 and described herein. Generally, the data flow of FIG. 5 can occur on a provider device 100*b*, but can occur on any element or combination of elements within the environment.

To determine 500 the provider state, the provider client device receives a verification request 510 including a verification process from the network system. The verification process includes a set of interaction requests configured to determine the provider state. The verification module provides the interaction requests to the provider 520 via the user interface of the client device. The verification module receives interactions from the provider 530 in response to the interaction requests. The verification module analyzes the received interactions 540 and determines the provider state 550 based on the analyzed interactions. In some embodiments, the verification module sends the received interactions to the network system and the state investigation module analyzes the interactions and determines the provider state.

Figure 6:
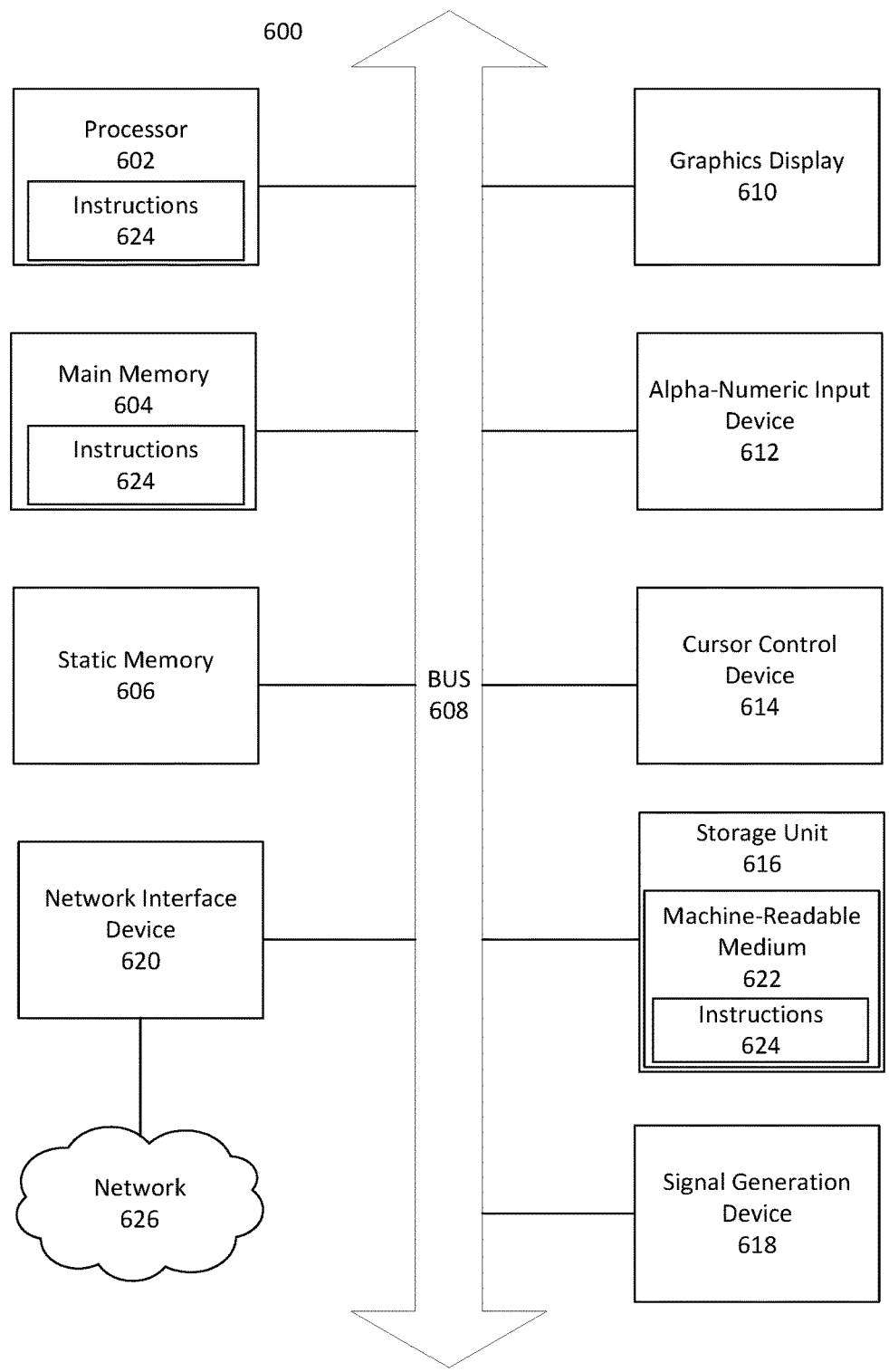
FIG. 6 shows a computer system, in accordance with some embodiments.

FIG. 6 is a block diagram illustrating components of an example machine for reading and executing instructions from a machine-readable medium. Specifically, FIG. 7 shows a diagrammatic representation of system 130 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 606. The computer system may include a storage unit 616. The processor 602, memory 604, and the storage unit 616 communicate via a bus 608.

In addition, the computer system 606 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include the functionalities of modules of the system 130 described in FIG. 2. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed datastore, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

ALTERNATIVE CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure. For example, while the present disclosure discusses predicting provider involvement in potential safety incidents, the methods and systems herein can be used more generally for any purpose where one would want to predict involvement in potential incidents using a machine learning model.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for determining abnormal driving characteristics comprising:
   receiving current telematics data from a client device for a provider providing a service along at least a portion of a route, the telematics data describing movement of the client device during the service;
   determining a typical frequency of one or more abnormal behaviors associated with the portion of the route based on a set of aggregate telematics data gathered from a set of client devices;
   generating a provider profile with identifying information of the provider, including a deviation from the typical frequency of the one or more abnormal behaviors for the provider;
   determining an expected frequency of the one or more abnormal behaviors for the provider along the portion of the route by adjusting the typical frequency of the one or more abnormal behaviors based on the provider profile;
   generating an abnormality score reflecting a difference between a current frequency of the one or more abnormal behaviors of the current telematics data and the expected frequency of the one or more abnormal behaviors,
   when the abnormality score exceeds a threshold, identifying at least one abnormal driving characteristic of the provider;
   generating a corrective recommendation based on the at least one abnormal driving characteristic of the provider.

2. The method of claim 1, wherein
   the provider provides a service along a route and the received telematics data is associated with the route;
   the aggregate telematics data of the set of client devices is associated with the route; and
   determining the abnormality score is based on the route.

3. The method of claim 2, wherein determining the abnormality score is based on the route comprises:
   determining a road segment of the route based on the received telematics data; and
   comparing the aggregate telematics data of the set of client devices on the road segment to the telematics data of the client device on the road segment.

4. The method of claim 2, wherein determining the abnormality score based on the route accounts for real-time deviations of the provider from the route.

5. The method of claim 1, wherein
   the provider profile further specifies an average frequency of the one or more abnormal behaviors and a standard deviation from the average frequency of the one or more abnormal behaviors; and the abnormality score reflects the standard deviation from the average frequency of the one or more abnormal behaviors.

6. The method of claim 1, wherein the threshold is a standard deviation of three sigmas away from the average frequency of the one or more abnormal behaviors.

7. The method of claim 1, comprising:
creating the provider profile based on the normal behavior of the set of client devices.

8. The method of claim 7, wherein the created provider profile is based on any of a country, a state, or a city in which the provider and the set of client devices is providing the service.

9. The method of claim 7, comprising:
modifying the created provider profile based on the received telematics data of the provider as the provider provides the service.

10. The method of claim 1, wherein identifying unusual driving characteristics of the provider is in response to a trigger, the trigger being one or more of: an input from a requesting user associated with the provider using the service, a threshold amount of time the provider has been providing the service, a variation in the abnormality score, or a variation in the telematics data.

11. The method of claim 1, wherein the abnormality score is associated with one or more of: a speed of the provider, a change in the speed of the provider, a set of previously identified unusual driving characteristics, a position of the provider, a set of received interactions from the provider using the client device, a route of the service, or a requesting user of the service associated with the provider.

12. The method of claim 1, comprising:
determining the state of the service provider, the state associated with the unusual driving characteristics of the provider; and
wherein the state of the service provider includes any of: inebriation, sleep deprivation, or mental state.

13. The method of claim 12, wherein the corrective recommendation is based on the state of the provider.

14. The method of claim 1, comprising:
providing the corrective recommendation to the provider; and
wherein the corrective recommendation determines the cause of unusual driving characteristics.

15. The method of claim 1, wherein the corrective recommendation is an interactive test for the provider, the interactive test determining a subsequent corrective recommendation for the provider.

16. The method of claim 1, wherein the corrective recommendation is based on at least one previous corrective recommendation associated with the provider.

17. A non-transitory computer-readable storage medium storing computer program instructions executable by a processor of a system to perform steps for determining abnormal driving characteristics comprising:
receiving current telematics data from a client device for a provider providing a service along at least a portion of a route, the telematics data describing movement of the client device during the service;
determining a typical frequency of one or more abnormal behaviors associated with the portion of the route based on a set of aggregate telematics data gathered from a set of client devices;
generating a provider profile with identifying information of the provider, including a deviation from the typical frequency of the one or more abnormal behaviors for the provider;
determining an expected frequency of the one or more abnormal behaviors for the provider along the portion of the route by adjusting the typical frequency of the one or more abnormal behaviors based on the provider profile;
generating an abnormality score reflecting a difference between a current frequency of the one or more abnormal behaviors of the current telematics data and the expected frequency of the one or more abnormal behaviors,
when the abnormality score exceeds a threshold, identifying at least one abnormal driving characteristic of the provider;
generating a corrective recommendation based on the at least one abnormal driving characteristic of the provider.

18. The non-transitory computer-readable storage medium of claim 17, wherein
the provider provides a service along a route and the received telematics data is associated with the route;
the behavior of a set of client devices is associated with the route; and
determining the abnormality score is based on the route.

19. The non-transitory computer-readable storage medium of claim 17, wherein determining the abnormality score is based on the route further comprises:
determining a road segment of the route based on the received telematics data; and
comparing the aggregate telematics data of the set of client devices providing the service on the road segment to the telematics data of the client device on the road segment.

20. A method for remediating abnormal driving characteristics, the method comprising:
generating, for a first provider of a transportation service, a provider profile, the provider profile including a deviation of the first provider's driving characteristics from a typical frequency of abnormal behavior;
determining, for a portion of a route, a typical frequency of abnormal behaviors along the portion of the route, the typical frequency based on historical telematics data collected from a plurality of client devices of other providers traveling along the portion of the route;
determining an expected frequency of the one or more abnormal behaviors for the first provider along the portion of the route by adjusting the typical frequency of the one or more abnormal behaviors along the portion of the route based on the deviation included in the first provider profile;
receiving current telematics data from a client device of the first provider while the first provider is providing a transportation service, the current telematics data describing movement of the client device along the portion of the route;
generating an abnormality score reflecting a difference between a current frequency of the one or more abnormal behaviors observed in the received current telematics data and the expected frequency of the one or more abnormal behaviors;
responsive to the abnormality score exceeding a threshold, identifying at least one abnormal driving characteristic of the provider; and providing a corrective recommendation based on the at least one abnormal driving characteristic of the first provider.

\* \* \* \* \*